April 24, 1951     M. SWANSON     2,549,860

METHOD OF AND MEANS FOR INDICATING A CHOSEN AREA

Filed Sept. 10, 1936

INVENTOR
MARK SWANSON
BY
Robert A. Lavender
ATTORNEY

Patented Apr. 24, 1951

2,549,860

UNITED STATES PATENT OFFICE 2,549,860

METHOD OF AND MEANS FOR INDICATING A CHOSEN AREA

Mark Swanson, Washington, D. C.

Application September 10, 1936, Serial No. 100,177

12 Claims. (Cl. 343—108)

(Granted under the act of March 3, 1883, as amended April 30, 1928; 370 O. G. 757)

This invention relates to a method of and means for indicating, by radiant energy, the position and bounding limits of a chosen area, more particularly an aircraft landing field or the landing deck of a carrier obscured by darkness or fog.

Among the objects of this invention are:

To provide a means and method for utilizing infra-red rays or very short radio rays to indicate the position and limits of a given area;

To provide means to insure the safe handling of aircraft while landing upon fogbound or darkened airports or the decks of aircraft carriers.

To provide means of the type specified that will be invisible except when detected by suitable receiving devices;

To provide normally invisible means that will enable a pilot to establish his exact position with respect to runways and his elevation thereabove.

Figures 6, 7:
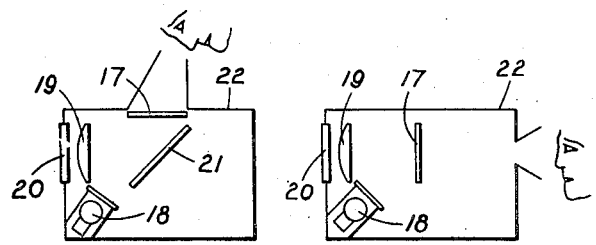
Fig. 6 shows schematically one form of detector for use of infra-red rays.

Fig. 7 likewise illustrates a receiver but in which the image is inverted in one direction by reflection.

The principle and the mode of use of my invention will be set forth and illustrated by reference to beams of infra-red light, but it is also contemplated that radio beams of ultra high frequency (micro-waves or quasi-optical waves), which behave in many respects like light, may be used. Further, while particular reference is herein made to landing areas for aircraft, it is to be understood that the usefulness thereof extends to the indication of areas for other purposes. It will be obvious to those skilled in this art that when micro-waves are used the separate beams will be detected by apparatus of known construction tuned to the frequency of the particular beam.

Figure 1:
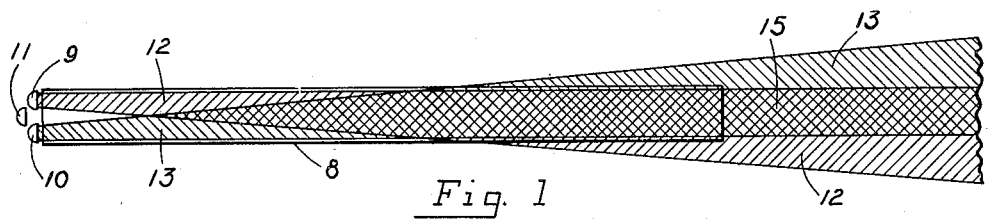
Fig. 1 is a top plan view illustrating the relation of the sources of radiant energy with respect to a chosen area whereof the position is to be defined.
Figure 2:
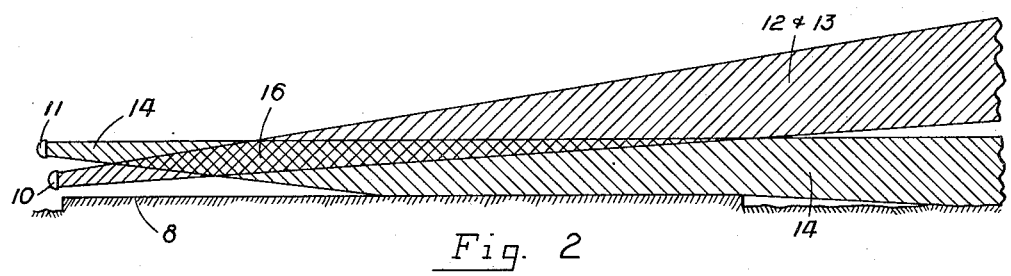
Fig. 2 is a side elevational view of the same but with the addition of a beam defining a known elevation above the area.

In Fig. 1 the chosen area 8 is provided at one end with sources 9, 10 and 11 that project beams 12, 13 and 14, respectively, of radiant energy along the chosen area 8. The sources 9 and 10 are so adjusted that, as viewed in the direction of propagations of the beams, the left-hand edge of beam 12 is parallel to and substantially coincides with the left-hand edge of area 8, while the right-hand edge of beam 13 has a like relation to the right-hand edge of the area, the other edge of each beam extending beyond the respectively opposite edge of the area 8, thus forming an overlapping zone 15 of substantially the width of the area 8 and in alinement therewith, wherein both the sources 9 and 10 may be detected, but beyond which and within the limits of either beam but one thereof may be detected. The source 11 is so adjusted that the upper edge thereof, as seen in Fig. 2, is substantially parallel to the surface of area 8 at a known distance above that surface. It will be noted from the relative position of source 11 with respect to sources 9 and 10 that the beam 14 lies within the horizontal limits of beams 12 and 13 but that the beams 12 and 13 are projected upwardly at an angle to permit the same to be detected while at a safe elevation above the area and that there is a zone 16 above the area and within the vertical planes bounding the same that is common to all three beams.

When using infra-red rays they may be detected due to the extinguishing or intensifying effect of infra-red light upon luminescence. It is apparent, however, that the luminescent material must show under infra-red stimulus practically no time lag, that is, it must be practically instantaneously excitable and extinguishable under infra-red stimulus due to the fact that the infra-red sources, when viewed from a rapidly moving aircraft, would appear as lines rather than spots if there were persistence of luminescence. The luminescent material I use has the desired characteristics to a higher degree than any heretofore known that I was able to procure. It consists of a sulphide of either an alkaline earth metal or zinc with a minute percentage of manganese or rhenium as the activating impurity. This material and a method of preparing the same are fully disclosed in my copending application, Serial No. 100,178, filed September 10, 1936, U. S. Patent No. 2,396,298, issued March 12, 1946.

The detector shown in Fig. 6 comprises a luminescent screen 17 irradiated by ultra-violet light from a suitable source 18 which may be a small argon glow lamp with a filter for preventing the passage of other than the long wave length ultra-violet rays. The lens 19 and window 20 are of glass such as that known to the trade as Corning No. 254, that will pass infra-red rays. It will be observed that the lens 19 will give an image that is inverted in all planes. The infra-red light sources appear on the screen 17 as very bright yellowish or whitish-yellow spots and thus the normally invisible radiation is translated into visible light, which contrasts strongly with the dull reddish glow that is normally just perceptible resulting from the irradiation of screen 17 with ultra-violet light.

The form of detector shown in Fig. 7 is in general similar to that of Fig. 6 except that a mirror 21, set at an angle of 45° to the light coming through lens 19 and also to the surface of screen 17 erects the image in one plane. The detecting elements in both Figs. 6 and 7 are housed in a light-proof inclosure 22.

Figure 3:
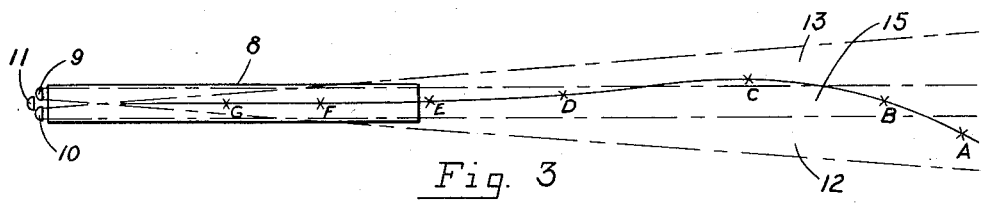
Fig. 3 is in general similar to Fig. 1 but indicates the path that may be followed by a pilot in landing under the guidance of the radiant energy beams.
Figure 4:
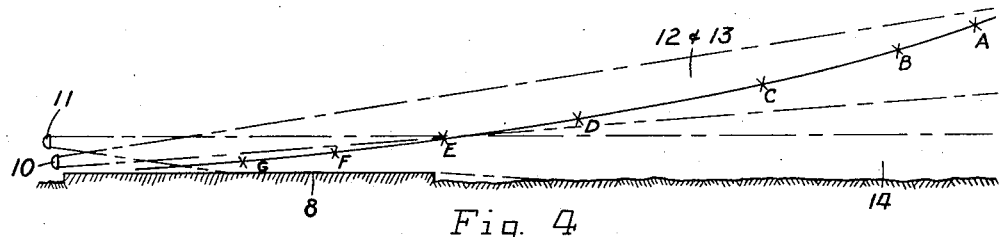
Fig. 4 shows a side view of the path followed by a pilot in landing.
Figure 5:
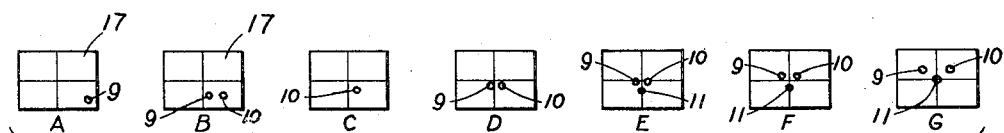
Fig. 5 illustrates the indication received by the pilot at the various positions indicated in Figs. 3 and 4 at the points designated by letters corresponding to the letters indicating the several parts of Fig. 5.

The method of landing an aircraft under the guidance of the system of beams above described will now be set forth. The pilot will know in general the position of the area 8 and will so set his course as to enter one or more of the beams 12, 13 and 14. In Figs. 3 and 4 his path is indicated as coming into the beams from above and from the left, as viewed by the pilot. If he is using the detector shown in Fig. 6, when he has reached the point A he will perceive the image of the source 9 in the lower right-hand corner of screen 17 as shown at A in Fig. 5, indicating his plane is headed longitudinally to the right of area 8 with nose down. When he has reached the point B he will perceive both the sources 9 and 10 as indicated at B in Fig. 5, due to the fact that he is in the common zone 15 and he then knows that his position is alined with the area 8 but he is still headed to the right of 8. However, his flight direction continues him across the zone 14 and when at point C he will perceive the source 10 as shown at C in Fig. 5. He then swings back to the left to reenter the common zone 14 and again picks up both of sources 9 and 10 as indicated at D in Fig. 5. This shows he is centrally located over area 8 with nose slightly down. He noses down to lose altitude and enters the zone 16 common to all three beams, when the appearance on the screen is as shown at E of Fig. 5, and he knows that he is then at an altitude less than that indicated by the upper limit of beam 14 and within the vertical planes bounding area 8 so he continues to lose altitude and land, the appearance on the screen at the points F (leveling off and raising nose) and G (nose up, tail down) in Figs. 3 and 4 being as indicated at F and G in Fig. 5. When within the beams 12 and 13, the lateral position of the plane is evident. Departure from lateral position is obvious from angular displacement of the horizontal images with respect to the screen.

When micro-waves are used instead of invisible light a suitable reflector to direct those waves into a beam will be used in connection with each transmitter and a separate receiver provided with an indicator will be tuned to the respective frequency of each of the transmitters so that the indication of any given receiver will show that the craft is within the beam of the transmitter to which the receiver is tuned. The apparatus for transmitting and receiving micro-waves is known in the art and is therefore not illustrated but it is well adapted for practicing my method.

The invention herein described and claimed may be used and/or manufactured by or for the Government of the United States of America for governmental purposes without the payment of any royalties thereon or therefor.

I claim:

1. A system as described, comprising means for projecting two laterally overlapping beams of invisible radiant energy that includes infra-red light, said beams having their upper and lower limits substantially in common respective transverse planes and a lateral limit of each beam substantially defining a corresponding lateral boundary of a selected area, other means for projecting a like beam lying between said lateral boundaries but so directed out of the said common zone of the other beams that the overlapping of the beam from the last mentioned means upon the other said beams terminates substantially at the terminus of said area, and means to detect said infra-red component including a screen coated with substantially instantaneously responsive luminescent material, a source of ultra-violet light to irradiate said screen to excite luminescence thereon, and means to project on said screen the images of all of said projecting means within the field of said detecting means, said images being rendered visible on said screen by the effect of the infra-red light upon said luminescence.

2. A system as described, comprising means for projecting two laterally overlapping beams of radiant energy, said beams having their upper and lower limits substantially in common respective transverse planes and a lateral limit of each beam substantially defining a corresponding lateral boundary of a selected area, other means for projecting a like beam lying between said lateral boundaries but so directed out of the said common zone that the overlapping of the beam from the last mentioned means upon the other said beams terminates substantially at the terminus of said area, and receiving means to detect and distinguishingly identify said beams.

3. A system as described, comprising means for projecting a pair of laterally overlapping beams of radiant energy at an angle above the horizon with one lateral limit of each defining the corresponding edge of a chosen area but the other lateral limit of each extending beyond the edge of the area corresponding thereto, whereby a zone common to the two beams lies between vertical planes at the lateral boundaries of said area, means to project a third beam in general below the other said beams but having in common therewith a zone lying within vertical planes bounding said area, and receiving means to detect and distinguishingly identify all of the beams lying within the field of said receiving means.

4. A system as described, comprising means for projecting a pair of laterally overlapping beams of radiant energy at an angle above the horizon with one lateral limit of each defining the corresponding edge of a chosen area but the other lateral limit of each extending beyond the edge of the area corresponding thereto, whereby a zone common to the two beams lies between vertical planes at the lateral boundaries of said area, means to project a third beam in general below the other said beams with its upper limit substantially horizontal but having in common therewith a zone lying within vertical planes bounding said area, and receiving means to detect and distinguishingly identify all of the beams lying within the field of said receiving means.

5. A system as described, comprising means to project at a low angle above the horizon a pair of laterally overlapping beams that include infra-red light, each of said beams not extending laterally beyond the corresponding lateral boundary of a selected area but extending laterally beyond the lateral boundary opposite thereto, there being thus a zone common to the two beams, means to project a third like beam with its upper limit substantially horizontal and having a zone common with the said beams, the said zone common to all three beams lying within vertical planes bounding said area, and means for receiving said infra-red light and rendering the same visible while indicating, by the relative position in said receiving means of the light rendered visible as aforesaid, the projecting means from which the light is derived.

6. A method of indicating the location and limits of an obscured landing area for aircraft, comprising the steps of projecting at an angle above the horizontal, two beams having at least a component in the infra-red, one lateral limit of each beam substantially coinciding with a corresponding side of said area, the other lateral limit of each beam extending beyond the correspondingly opposite side of the area, the said beams overlapping and having a common zone alined with and substantially the width of said area, projecting a third like beam with the upper limit thereof substantially parallel to the surface of said area and having a zone in common with the other two beams within vertical planes bounding said area, and converting said infra-red light into visible light to identify the positional significance of all beams in the field of detection, whereby the aircraft pilot so identifying said beams may cause his craft to enter the zone common to all three beams and land therein.

7. A method of indicating the location and limits of an obscured landing area for aircraft, comprising the steps of projecting at an angle above the horizontal, two beams having at least a component in the infra-red, one lateral limit of each beam substantially coinciding with a corresponding side of said area, the said beams overlapping and having a common zone alined with and substantially the width of said area, projecting a third like beam with the upper limit thereof substantially parallel to the surface of said area and having a zone in common with the other two beams within vertical planes bounding said area, and converting said infra-red light into visible light to identify the positional significance of all beams in the field of detection, whereby the aircraft pilot so identifying said beams may cause his craft to enter the zone common to all three beams and land therein.

8. A method of indicating the location of an obscured landing area for aircraft, comprising the steps of so projecting two beams of invisible radiant energy at an angle above the horizontal that one lateral limit of each beam substantially coincides with a corresponding side of said area while the other lateral limit of each beam extends beyond the correspondingly opposite side of said area, the said beams thus overlapping and having a common zone alined with and substantially the width of said area, projecting a third like beam with the upper limit thereof substantially parallel to the surface of said area and having a zone in common with the other two beams within vertical planes bounding said area, and detecting said energy to determine the positional significance of all beams in the field of detection, whereby the aircraft pilot observing the indication of said detected energy may cause his craft to enter the zone common to all three beams and land therein.

9. A method of indicating the location and limits of an obscured landing area for aircraft, comprising the steps of projecting, at an angle above the horizontal, two beams having at least a component in the infra-red, one lateral limit of each beam substantially coinciding with a corresponding side of said area, the other lateral limit of each beam extending beyond the correspondingly opposite side of the area, the said beams overlapping and having a common zone alined with and substantially the width of said area, and projecting a third like beam with the upper limit thereof substantially parallel to the surface of said area and having a zone in common with the other two beams within vertical planes bounding said area.

10. A method of indicating the location of an obscured landing area for aircraft, comprising the steps of so projecting two beams of invisible radiant energy at an angle above the horizontal that said beams have in common a zone of substantially the width of said area alined with said area to define the lateral limits and the azimuthal orientation of said area, and projecting a third like beam to have in common with the said two beams a portion of said common zone lying within vertical planes bounding said area and to indicate an altitude above the surface of said area.

11. A method of indicating the location of an obscured landing area for aircraft, comprising the steps of so projecting two beams of radiant energy at an angle above the horizontal that one lateral limit of each beam substantially coincides with a corresponding side of said area while the other lateral limit of each beam extends beyond the correspondingly opposite side of said area, the said beams thus overlapping and having a common zone alined with and substantially the width of said area, projecting a third like beam with the upper limit thereof substantially parallel to the surface of said area and having a zone in common with the other two beams within vertical planes bounding said area, and detecting said energy to determine the positional significance of all beams in the field of detection, whereby the aircraft pilot observing the indication of said detected energy may cause his craft to enter the zone common to all three beams and land therein.

12. A method of indicating the location of an obscured landing area for aircraft, comprising the steps of so projecting two beams of radiant energy at an angle above the horizontal that said beams have in common a zone of substantially the width of said area alined with said area to define the lateral limits and the azimuthal orientation of said area, and projecting a third like beam to have in common with the said two beams a portion of said common zone lying within vertical planes bounding said area and to indicate an altitude above the surface of said area.

MARK SWANSON.

REFERENCES CITED

The following references are of record in the file of this patent:

UNITED STATES PATENTS

| Number | Name | Date |
| --- | --- | --- |
| 1,463,797 | Charbonneau | Aug. 7, 1923 |
| 1,813,491 | Gillard | July 7, 1931 |
| 1,948,552 | Weber | Feb. 27, 1934 |
| 2,012,412 | Wilmotte | Aug. 27, 1935 |
| 2,039,812 | Leib et al. | May 5, 1936 |
| 2,074,226 | Kunz et al. | Mar. 16, 1937 |
| 2,165,256 | Hansell | July 11, 1939 |

FOREIGN PATENTS

| Number | Country | Date |
| --- | --- | --- |
| 578,105 | France | June 23, 1924 |
| 391,374 | Great Britain | Apr. 27, 1933 |
| 408,321 | Great Britain | Apr. 9, 1934 |

OTHER REFERENCES

"The Colloidal Salts," by Weiser, 1st ed., page 164, published by McGraw-Hill, 1928.